United States Patent
Kurasako et al.

(10) Patent No.: US 11,987,955 B2
(45) Date of Patent: May 21, 2024

(54) WORK MACHINE MANAGEMENT SYSTEM

(71) Applicant: Hitachi Construction Machinery Co., Ltd., Tokyo (JP)

(72) Inventors: Akira Kurasako, Tsuchiura (JP); Hideki Akita, Tsuchiura (JP); Hidekazu Motoki, Kashiwa (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 313 days.

(21) Appl. No.: 17/633,458

(22) PCT Filed: Apr. 15, 2020

(86) PCT No.: PCT/JP2020/016623
§ 371 (c)(1),
(2) Date: Feb. 7, 2022

(87) PCT Pub. No.: WO2021/044660
PCT Pub. Date: Mar. 11, 2021

(65) Prior Publication Data
US 2022/0282455 A1     Sep. 8, 2022

(30) Foreign Application Priority Data
Sep. 3, 2019 (JP) ................................ 2019-160201

(51) Int. Cl.
*E02F 9/22* (2006.01)
*E02F 9/26* (2006.01)
(52) U.S. Cl.
CPC .............. *E02F 9/2235* (2013.01); *E02F 9/26* (2013.01); *E02F 9/2271* (2013.01)
(58) Field of Classification Search
CPC .......... Y02T 10/40; G01P 5/245; E02F 9/226; E02F 9/24; E02F 9/2054; E02F 9/268;
(Continued)

(56) References Cited

U.S. PATENT DOCUMENTS

| 5,540,554 A | 7/1996 | Masuzawa |
| 2017/0284068 A1 | 10/2017 | Nakamura et al. |
| 2020/0325657 A1 | 10/2020 | Takami et al. |

FOREIGN PATENT DOCUMENTS

| CN | 104912646 A | * | 9/2015 | .............. E02F 9/226 |
| CN | 104912646 A | | 9/2015 | |

(Continued)

OTHER PUBLICATIONS

International Search Report (PCT/ISA/210) issued in PCT Application No. PCT/JP2020/016623 dated Jun. 30, 2020 with English translation (four (4) pages).

(Continued)

*Primary Examiner* — Khoi H Tran
*Assistant Examiner* — Bryant Tang
(74) *Attorney, Agent, or Firm* — Crowell & Moring LLP (57) ABSTRACT

It is made possible to prevent damage to hydraulic parts of a work machine due to a decrease in performance of a hydraulic fluid even when the hydraulic fluid of a hydraulic system is changed and the hydraulic fluid becomes a mixed oil in which a mineral oil and a biodegradable oil are mixed with each other. For this purpose, a storage device stores, in advance, oil change history information of the hydraulic fluid, oil kind determination values for determining whether the hydraulic fluid is either the mineral oil or the biodegradable oil or the mixed oil of the mineral oil and the biodegradable oil, and abnormality determination values for respective kinds of the hydraulic fluid. A controller checks whether the oil change history information includes oil change information for which oil kind determination has not been made. When there is oil change information for which oil kind determination has not been made, the controller determines a kind of the hydraulic fluid on the basis of the respective values of a plurality of oil properties detected by an oil sensor and the oil kind determination values. The (Continued)

controller determines an abnormality in the hydraulic fluid by using abnormality determination values corresponding to a result of determination of the kind of the hydraulic fluid.

8 Claims, 9 Drawing Sheets

(58) Field of Classification Search
CPC ..... F01P 7/12; F01P 2025/08; B60Y 2306/05; B60Y 2200/412; B60Y 2200/41; F15B 19/005; F15B 21/04; F15B 2211/857; G06Q 50/10; G05B 23/02
See application file for complete search history.

(56) References Cited

FOREIGN PATENT DOCUMENTS

| CN | 106575117 A | | 4/2017 | |
|---|---|---|---|---|
| JP | 3220579 B2 | | 10/2001 | |
| JP | 2007-292238 A | | 11/2007 | |
| JP | 2007292238 A | * | 11/2007 | |
| JP | 2010-65578 A | | 3/2010 | |
| JP | 2017-191064 A | | 10/2017 | |
| JP | 2017191064 A | * | 10/2017 | |
| JP | 2018-178747 A | | 11/2018 | |
| JP | 2018178747 A | * | 11/2018 | |
| KR | 20090023801 A | * | 2/2009 | ............ E02F 9/2054 |
| KR | 10-2009-0023801 A | | 3/2009 | |
| WO | WO 2019/021502 A1 | | 1/2019 | |

OTHER PUBLICATIONS

Japanese-language Written Opinion (PCT/ISA/237) issued in PCT Application No. PCT/JP2020/016623 dated Jun. 30, 2020 (three (3) pages).
Extended European Search Report issued in European Application No. 20859706.2 dated Jun. 19, 2023 (7 pages).
International Preliminary Report on Patentability (PCT/IB/338 & PCT/IB/373) issued in PCT Application No. PCT/JP2020/016623 dated Mar. 17, 2022, including English translation of document C2 (Japanese-language Written Opinion (PCT/ISA/237) filed on Feb. 7, 2022) (five (5) pages).
Chinese-language Office Action issued in Chinese Application No. 202080055639.3 dated Sep. 19, 2022 (eight (8) pages).

* cited by examiner

(A) TEMPERATURE CHARACTERISTICS OF DENSITY OF HYDRAULIC FLUID (B) TEMPERATURE CHARACTERISTICS OF PERMITTIVITY OF HYDRAULIC FLUID

|  | MONITOR DISPLAY | OVERHEAT TEMPERATURE THRESHOLD VALUE | ABNORMALITY DETERMINATION VALUES |
|---|---|---|---|
| MINERAL OIL | ABSENT | Ta | Aa1 Aa2<br>Ba1 Ba2<br>Ca1 Ca2 |
| BIODEGRADABLE OIL | ABSENT | Tb | Ab1 Ab2<br>Bb1 Bb2<br>Cb1 Cb2 |
| MIXED OIL OF MINERAL OIL AND BIODEGRADABLE OIL | PRESENT | Tc | Ac1 Ac2<br>Bc1 Bc2<br>Cc1 Cc2 |
| CAUSE INVESTIGATION | PRESENT | UNCHANGED | UNCHANGED |

WORK MACHINE MANAGEMENT SYSTEM

TECHNICAL FIELD

The present invention relates to a management system of a work machine such as a hydraulic excavator or the like.

BACKGROUND ART

As a hydraulic fluid used as a power transmitting medium in a hydraulic circuit of a work machine such as a hydraulic excavator or the like, an environmentally friendly biodegradable hydraulic fluid is coming into use in place of a mineral oil. Patent Document 1 proposes a "hydraulic system control method for a construction machine, wherein the output horsepower of a hydraulic pump is changed so as to be limited by operating a bio-oil mode setting switch separate from a function of selecting a necessary power mode from a plurality of power modes related to the pump output horsepower in a case of using a mineral oil-based hydraulic fluid when a kind of hydraulic fluid used by the construction machine is changed from the mineral oil-based hydraulic fluid to a biodegradable hydraulic fluid" in the construction machine (work machine) using such a biodegradable hydraulic fluid.

PRIOR ART DOCUMENT

Patent Document

Patent Document 1: Japanese Patent No. 3220579

SUMMARY OF THE INVENTION

Problem to be Solved by the Invention

A genuine mineral oil of a manufacturer is generally used as an initially filled oil of a hydraulic fluid used in a hydraulic system of a work machine such as a hydraulic excavator or the like. On the other hand, the hydraulic fluid is degraded as the work machine is operated, and the hydraulic fluid is therefore replaced at intervals of 1 to 2 years, for example. At this time, a biodegradable hydraulic fluid may be used in place of a mineral oil. In that case, there is a problem as follows.

When the hydraulic fluid is replaced, the hydraulic fluid in an oil tank is extracted, and is replaced with a new oil. However, at a time of substituting the new oil, the old oil remains in pipes of the hydraulic circuit and actuators (for example, hydraulic cylinders) or the like. Therefore, nearly 100% of the old oil is replaced with the new oil to an extent possible by performing an operation referred to as flushing, which circulates the remaining oil within the hydraulic circuit by actuating the actuators.

However, due to cost and the number of man-hours involved in the flushing, the flushing may be omitted, or the number of times of the flushing may be reduced, thus when a change is made from the mineral oil to the biodegradable oil, the mineral oil cannot be sufficiently changed to the biodegradable oil, and becomes a mixed oil in which the mineral oil and the biodegradable oil are mixed with each other. In general, when different kinds of oils are mixed with each other, the performance of the hydraulic fluid is decreased for a reason that the performance of the mixed oil is lowered to poorer performance, or that a reaction not desirable in terms of performance is produced, for example. When the hydraulic fluid continues to be used in this state, a risk of damaging hydraulic parts of the work machine is increased.

According to Patent Document 1, it is possible to limit the output horsepower of the hydraulic pump and thereby suppress a rise in oil temperature by operating the bio-oil mode setting switch when the hydraulic fluid is changed from the mineral oil to the biodegradable oil, but the above-described problem in the case where the mineral oil and the biodegradable oil are used in a mixed manner cannot be solved.

It is an object of the present invention to provide a work machine management system that can prevent damage to hydraulic parts of a work machine due to a decrease in performance of a hydraulic fluid even when the hydraulic fluid of a hydraulic system is changed and the hydraulic fluid becomes a mixed oil in which a mineral oil and a biodegradable oil are mixed with each other.

Means for Solving the Problem

In order to solve such a problem, according to the present invention, there is provided a work machine management system including: a work machine including a hydraulic system that drives a plurality of actuators by a hydraulic fluid and an oil sensor that detects a plurality of oil properties including a density and a permittivity of the hydraulic fluid; a storage device that stores respective abnormality determination values of the plurality of oil properties; and a controller that diagnoses an abnormality in the hydraulic fluid by comparing respective values of the plurality of oil properties detected by the oil sensor with the respective abnormality determination values of the plurality of oil properties stored in the storage device, wherein the storage device stores, in advance, oil change history information of the hydraulic fluid, oil kind determination values for determining whether the hydraulic fluid is either a mineral oil or a biodegradable oil or a mixed oil of the mineral oil and the biodegradable oil, and abnormality determination values for respective kinds of the hydraulic fluid as the abnormality determination values, and the controller is configured to check whether the oil change history information stored in the storage device includes oil change information for which oil kind determination has not been made, determine a kind of the hydraulic fluid on a basis of the respective values of the plurality of oil properties detected by the oil sensor and the oil kind determination values stored in the storage device when there is oil change information for which oil kind determination has not been made, select corresponding abnormality determination values among the abnormality determination values for the respective kinds of the hydraulic fluid according to a result of determination of the kind of the hydraulic fluid, and determine the abnormality in the hydraulic fluid by using the abnormality determination values.

Advantages of the Invention

According to the present invention, it is possible to prevent damage to hydraulic parts of the work machine due to a decrease in performance of the hydraulic fluid even when the hydraulic fluid of the hydraulic system is changed and the hydraulic fluid becomes a mixed oil in which a mineral oil and a biodegradable oil are mixed with each other.

MODES FOR CARRYING OUT THE INVENTION

An embodiment of the present invention will hereinafter be described according to the drawings.

In the following, description will be made by taking, as an example, a hydraulic excavator as a work machine according to the present invention. However, the present invention is not limited to the hydraulic excavator, but is similarly applicable also to other work machines such as a dump truck, a wheel loader, a bulldozer, a forklift, a crane, and the like as long as the work machines include a hydraulic system using a hydraulic fluid.

Figure 1:
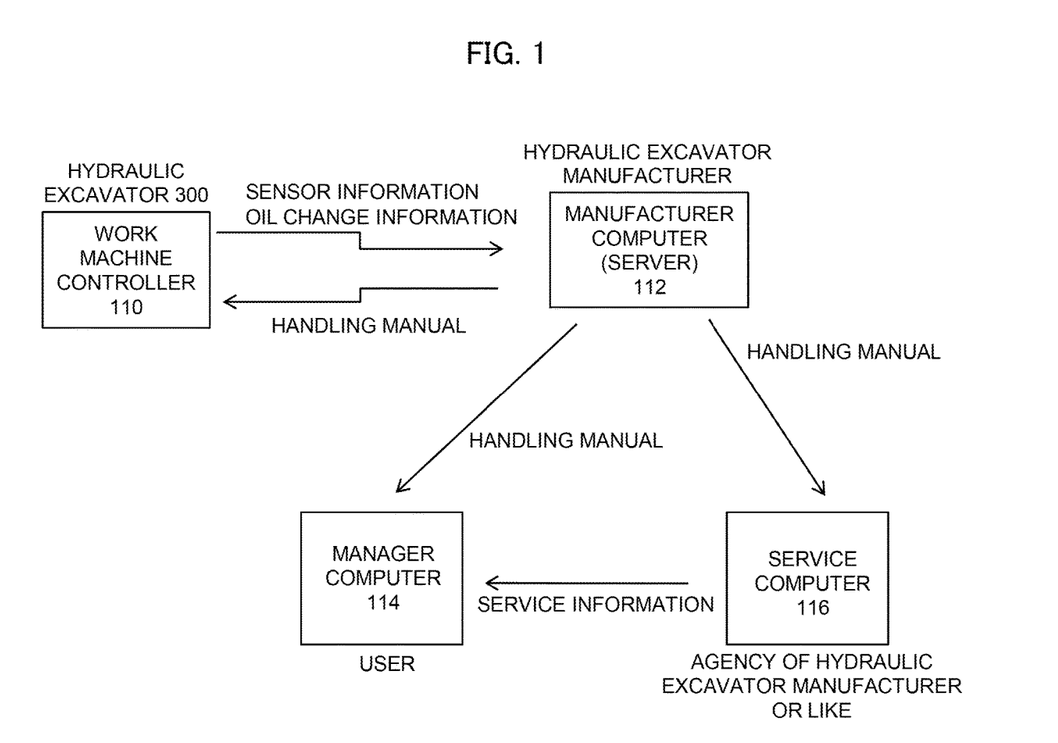
FIG. 1 is a diagram showing a general configuration of a management system of a work machine (hydraulic excavator) according to one embodiment of the present invention.

FIG. 1 is a diagram showing a general configuration of a management system of a work machine (hydraulic excavator) according to one embodiment of the present invention.

In FIG. 1, the management system of the work machine includes: a controller (work machine controller) 110 included in the hydraulic excavator 300 (see FIG. 2); a manufacturer computer (server) 112, which is under management of the manufacturer that manufactures the hydraulic excavator 300; a computer (computer for a manager) 114 used by a manager (user) of the hydraulic excavator 300; and a computer (computer for service) 116 used by a service person in charge (serviceperson) who belongs to the work machine manufacturer or a business office of the work machine manufacturer, an agency, or the like and performs troubleshooting and maintenance of the hydraulic excavator 300.

Though not shown, the controller 110 and the computers 112, 114, and 116 include a computation processing device (for example, a CPU) as computing means for performing various kinds of programs, a storage device (for example, a semiconductor memory such as a ROM, a RAM, a flash memory, or the like and a magnetic storage device (storage unit) such as a hard disk drive or the like) as storing means for storing various kinds of data including the programs, and an input-output computation processing device for performing input-output control on data, instructions, and the like for the computation processing device, the storage device, and the like. In addition, the controller 110 and the computers 112, 114, and 116 are connected to a network (for example, a LAN, a WAN, or the Internet) by radio or wire, and are configured to be able to mutually transmit and receive data. Further, a display device (for example, a liquid crystal monitor or the like) for displaying a processing result of the computation processing device and the like may be provided when information needs to be provided to persons including operators of the controller 110 and the computers 112, 114, and 116, and an input device (for example, numeric keys, a keyboard, a touch panel, or the like) may be provided when information needs to be input from a person.

Figure 2:
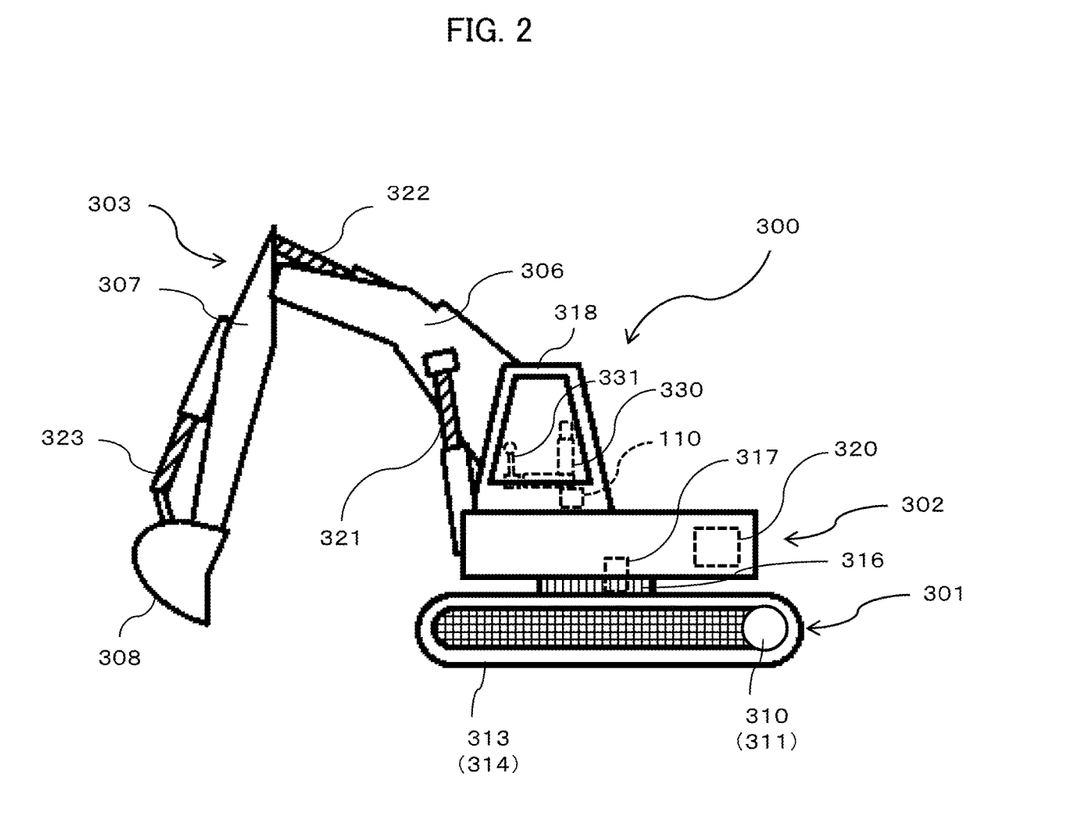
FIG. 2 is a diagram showing a general configuration of the hydraulic excavator as a work machine.

FIG. 2 is a diagram showing a general configuration of the hydraulic excavator 300.

In FIG. 2, the hydraulic excavator 300 well known as a work machine includes a lower track structure 301, an upper swing structure 302 swingably mounted on the lower track structure 301, and a front work implement 303 elevatably attached to a front portion of the upper swing structure 302.

The lower track structure 301 travels by driving a left and a right crawler 313 and 314 by rotation of a left and a right travelling motor (hydraulic motor) 310 and 311. The upper swing structure 302 can be swung with respect to the lower track structure 301 by rotation of a swing motor (hydraulic motor) 317 provided to a swing device 316.

The front work implement 303 includes a boom 306, an arm 307, and a bucket 308. The boom 306, the arm 307, and the bucket 308 can be rotated in an upward-downward direction by expansion and contraction of a boom cylinder (hydraulic cylinder) 321, an arm cylinder (hydraulic cylinder) 322, and a bucket cylinder (hydraulic cylinder) 323, respectively.

The upper swing structure 302 includes a cabin 318 forming a cab. A cab seat 330 in which an operator is to be seated, an operation device 331 to be operated by the operator, and the like are arranged within the cabin 318. In addition, the work machine controller 110, which has been described earlier, is disposed within the cabin 318, and a rear portion of the upper swing structure 302 includes an engine 320 as a driving source of the hydraulic system that drives the above-described plurality of actuators (the travelling motors 310 and 311, the swing motor 317, the boom cylinder 321, the arm cylinder 322, and the bucket cylinder 323). The hydraulic system supplies a hydraulic fluid as a power transmitting medium to the plurality of actuators, and thereby drives the plurality of actuators.

Figure 3:
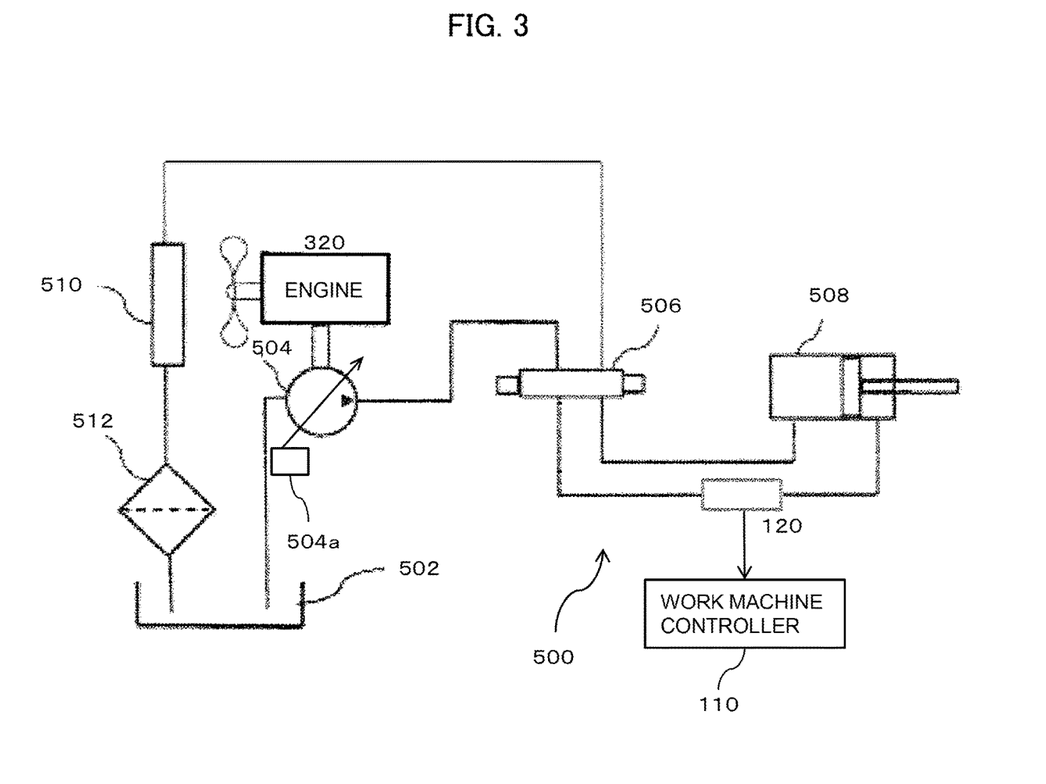
FIG. 3 is a diagram showing a hydraulic system provided to the hydraulic excavator.

FIG. 3 is a diagram showing the hydraulic system provided to the hydraulic excavator 300.

In FIG. 3, the hydraulic system indicated by reference numeral 500 includes the above-described engine 320, a hydraulic fluid tank 502, a hydraulic pump 504, a control valve 506, a hydraulic actuator 508, an oil cooler 510, and a hydraulic fluid filter 512. The hydraulic actuator 508 represents the plurality of actuators shown in FIG. 2 (the travelling motors 310 and 311, the swing motor 317, the boom cylinder 321, the arm cylinder 322, and the bucket cylinder 323). The control valve 506 also similarly represents respective control valves for the plurality of actuators.

The hydraulic pump 504 is of a variable displacement type. The hydraulic pump 504 has a regulator 504a that controls the tilting angle (displacement volume, that is, displacement) of the hydraulic pump 504, and thereby controls the delivery flow rate of the hydraulic pump 504. In addition, the regulator 504a decreases the tilting angle of the hydraulic pump 504 according to a rise in delivery pressure of the hydraulic pump 504. The absorption torque of the hydraulic pump 504 is thereby controlled so as not to exceed a maximum torque set by a spring (not shown). Stalling of the engine 320 due to an excessive load is thus prevented.

The hydraulic fluid within the hydraulic fluid tank 502 is pumped up by the hydraulic pump 504 driven by the engine 320, and is supplied to the hydraulic actuator 508 (for example, the boom cylinder 321) via the control valve 506. The control valve 506 controls the flow direction and flow rate of a hydraulic fluid supplied to the hydraulic actuator 508 according to a switching position of the operation device 331 (for example, an operation device for the boom). The hydraulic actuator 508 is thereby driven, thus the boom 306, for example, operates. In addition, the hydraulic fluid flowing out from the hydraulic actuator 508 is introduced into the oil cooler 510 via the control valve 506 and cooled by the oil cooler 510, and is thereafter returned to the hydraulic fluid tank 502 via the hydraulic fluid filter 512. The oil cooler 510 is cooled by an air taken in by a cooling fan 514 driven by the engine 320.

In addition, an oil sensor 120 is disposed on a hydraulic line between, for example, the control valve 506 and the hydraulic actuator 508 (for example, the boom cylinder 321) of the hydraulic system 500. The oil sensor 120 detects a plurality of oil properties such as the viscosity, density, permittivity, and the like of the hydraulic fluid passing through the hydraulic line and the temperature of the hydraulic fluid.

In the present embodiment, description will be made of a case where the oil sensor 120 detects three properties, that is, the viscosity, density, and permittivity of the hydraulic fluid and the temperature of the hydraulic fluid. However, the system may be configured such that the oil sensor 120 detects two oil properties, that is, the density and the permittivity as a plurality of oil properties. In addition, the system may be configured such that the oil sensor 120 further detects a color difference of the oil. Further, the system may be configured such that the oil sensor 120 detects the temperature, the viscosity, the density, the permittivity, and the color difference by assigning the temperature, the viscosity, the density, the permittivity, and the color difference to a plurality of oil sensors as appropriate, or the system may be configured such that the oil sensor 120 detects the same property at a plurality of different positions.

In addition, while only the oil sensor 120 that detects the oil properties and temperature of the hydraulic fluid has been described here in order to simplify the description, the hydraulic excavator 300 may be provided with an oil sensor that detects the oil properties and temperature of an engine oil, for example, in addition to the oil sensor 120.

Figure 4:
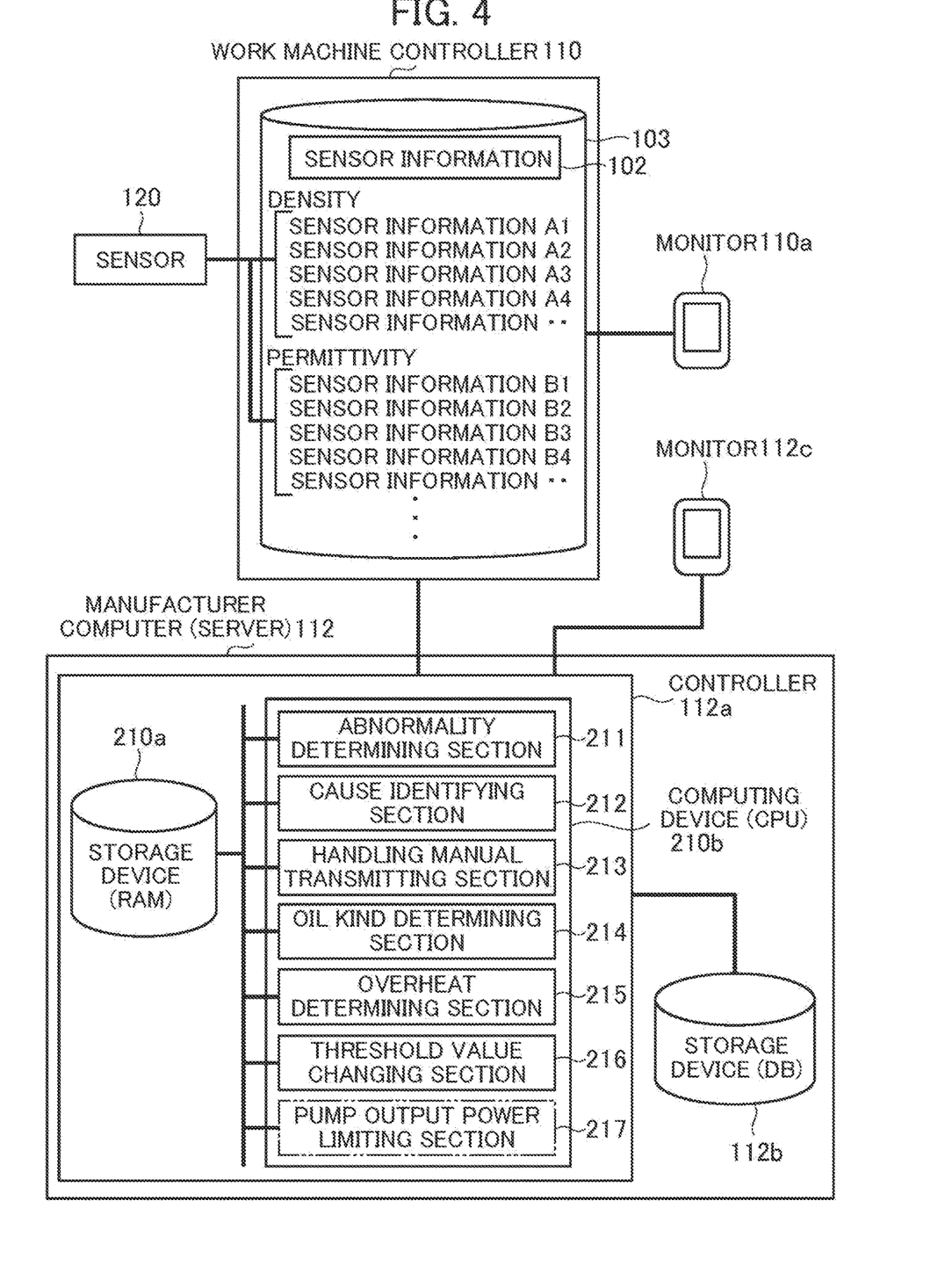
FIG. 4 is a diagram showing a general configuration of a controller for the work machine and a computer for a manufacturer.

FIG. 4 is a diagram showing a general configuration of the work machine controller 110 and the manufacturer computer 112.

The work machine controller 110 includes a storage device 103. A sensor signal of the oil sensor 120 mounted in the hydraulic excavator 300 is processed as appropriate, and is input to the work machine controller 110 as information indicating physical quantities of the oil properties and the temperature (which will be referred to as sensor information 102). The sensor information 102 is then stored in the storage device 103. At this time, as shown in FIG. 4, the sensor information 102 on the density from the oil sensor 120 at a certain time is processed by the work machine controller 110 as appropriate, and is stored as sensor information A1 in the storage device 103 of the work machine controller 110 in association with a measurement time. Sensor information A1, A2, A3, A4 . . . in FIG. 4 represents sensor information on the density measured by the oil sensor 120 at different times. Numbers at tail ends of the sensor information A1, A2, A3, A4 . . . are increased with the passage of time. The sensor information A1, A2, A3, A4 . . . on the density from the oil sensor 120 is thus stored as time series data in the work machine controller 110. Similarly, sensor information B1, B2, B3, B4 . . . in the figure represents sensor information 102 on the permittivity from the oil sensor 120. Though description will be omitted, the viscosity and the temperature detected by the oil sensor 120 are similarly stored as sensor information C1, C2, C3, C4 . . . and D1, D2, D3, D4 . . . in the storage device 103. In the following, these pieces of sensor information 102 may be written as sensor information A, B, C, and D as appropriate with suffixes thereof omitted.

The manufacturer computer (server) 112 includes a controller (control system) 112a and a storage device 112b. The sensor information A, B, C, and D stored in the storage device 103 of the work machine controller 110 is transmitted to the manufacturer computer 112 in a predetermined cycle, and is stored in the storage device 112b via the controller 104a. The sensor information A, B, C, and D may be stored in a storage device 210a (to be described later) within the controller 112a.

In addition, the controller 104a of the manufacturer computer 112 includes a storage device (RAM) 210a that stores a value in a process of computation and a computing device (CPU) 210b that performs respective pieces of processing of an abnormality determining section 211, a cause identifying section 212, a handling manual transmitting section 213, an oil kind determining section 214, an overheat determining section 215, and a threshold value changing section 216.

The storage device 112b of the manufacturer computer 112 stores abnormality determination values (to be described later) of each of the plurality of oil properties of the hydraulic fluid. The abnormality determining section 211 (controller) diagnoses an abnormality in the hydraulic fluid by comparing the respective values of the plurality of oil properties detected by the oil sensor 120 with the respective abnormality determination values of the plurality of oil properties, which are stored in the storage device 112b.

The cause identifying section 212 calculates, when the abnormality determining section 211 determines an abnormality in the hydraulic fluid, a change amount index value indicating a tendency of a temporal change in an oil property judged to be abnormal, compares the change amount index value with a change amount determination value stored in the storage device 112b in advance, and identifies a cause of the abnormality in the hydraulic fluid. Processing contents of the cause identifying section 212 are detailed in WO2019/021502A1.

The handling manual transmitting section 213 performs processing of transmitting a handling manual of repairing and maintenance according to the cause identified by the cause identifying section 212 to another terminal (for example, at least one of the work machine controller 110, the manager computer 114, and the service computer 116).

In addition, the storage device 112b stores, in advance, oil change history information of the hydraulic fluid, oil kind determination values (to be described later) for determining whether the hydraulic fluid is either a mineral oil or a biodegradable oil or a mixed oil of the mineral oil and the biodegradable oil, the oil kind determination values being set by at least one of the density and the permittivity of the hydraulic fluid, and abnormality determination values (to be described later) for the respective kinds of the hydraulic fluid as the abnormality determination values. The oil kind determining section 214 (controller) is configured to check whether the oil change history information stored in the storage device 112b includes oil change information for which oil kind determination has not been made. The oil kind determining section 214 is configured to determine the kind of the hydraulic fluid on the basis of the value of at least one of the plurality of oil properties detected by the oil sensor 120 and the oil kind determination values stored in the storage device 112b when there is oil change information for which oil kind determination has not been made. The abnormality determining section 211 (controller) is configured to determine an abnormality in the hydraulic fluid by using abnormality determination values of the hydraulic fluid corresponding to a result of the determination of the kind of the hydraulic fluid, among the abnormality determination values for the respective kinds of the hydraulic fluid.

Preferably, the storage device 112b stores oil kind determination values (to be described later) set by each of the density and the permittivity of the hydraulic fluid as the above-described oil kind determination values. The oil kind determining section 214 (controller) is configured to determines the kind of the hydraulic fluid by using the density and the permittivity of the hydraulic fluid detected by the oil sensor 120 and the respective oil kind determination values stored in the storage device 112b.

In addition, the oil kind determining section 214 (controller) is configured to correct the density and the permittivity of the hydraulic fluid detected by the oil sensor 120, to values not affected by the temperature of the hydraulic fluids detected by the oil sensor 120, and determines the kind of the hydraulic fluid by using the corrected density and the corrected permittivity of the hydraulic fluid.

In addition, the storage device 112b stores a first threshold value and a second threshold value larger than the first threshold value as the oil kind determination values for each of the density and the permittivity of the hydraulic fluid. The oil kind determining section 214 (controller) is configured to determine that the hydraulic fluid is the mineral oil when the density and the permittivity of the hydraulic fluid detected by the oil sensor 120 are both equal to or less than the first threshold value. The oil kind determining section 214 (controller) is configured to determine that the hydraulic fluid is the biodegradable oil when the density and the permittivity of the hydraulic fluid are both equal to or more than the second threshold value, and determine that the hydraulic fluid is the mixed oil of the mineral oil and the biodegradable oil when the density and the permittivity of the hydraulic fluid are both a value between the first threshold value and the second threshold value.

In addition, the oil kind determining section 214 (controller) is configured to determine that a cause investigation is necessary and outputs a cause investigation request when the density and the permittivity of the hydraulic fluid are a combination other than in the above-described divisions of the first threshold value and the second threshold value.

Further, the storage device 112b stores temperature threshold values (to be described later) for the respective kinds of the hydraulic fluid used for determining overheat of the hydraulic fluid. The overheat determining section 215 (controller) is configured to compare a temperature threshold value of the hydraulic fluid corresponding to the result of the determination of the kind of the hydraulic fluid among the temperature threshold values for the respective kinds of the hydraulic fluid with the temperature of the hydraulic fluid detected by the oil sensor 120, and determine whether the hydraulic fluid is in an overheat state.

The threshold value changing section 216 (controller) is configured to select corresponding abnormality determination values among the abnormality determination values for the respective kinds of the hydraulic fluid according to the result of the determination of the kind of the hydraulic fluid. The abnormality determining section 211 (controller) is configured to determine an abnormality in the hydraulic fluid by using the abnormality determination values.

In addition, the threshold value changing section 216 (controller) is configured to select a temperature threshold value corresponding to the result of the determination of the kind of the hydraulic fluid among the temperature threshold values for the respective kinds of the hydraulic fluid, and the overheat determining section 215 (controller) is configured to determine, by using the temperature threshold value, whether the hydraulic fluid is in an overheat state.

Figure 5:
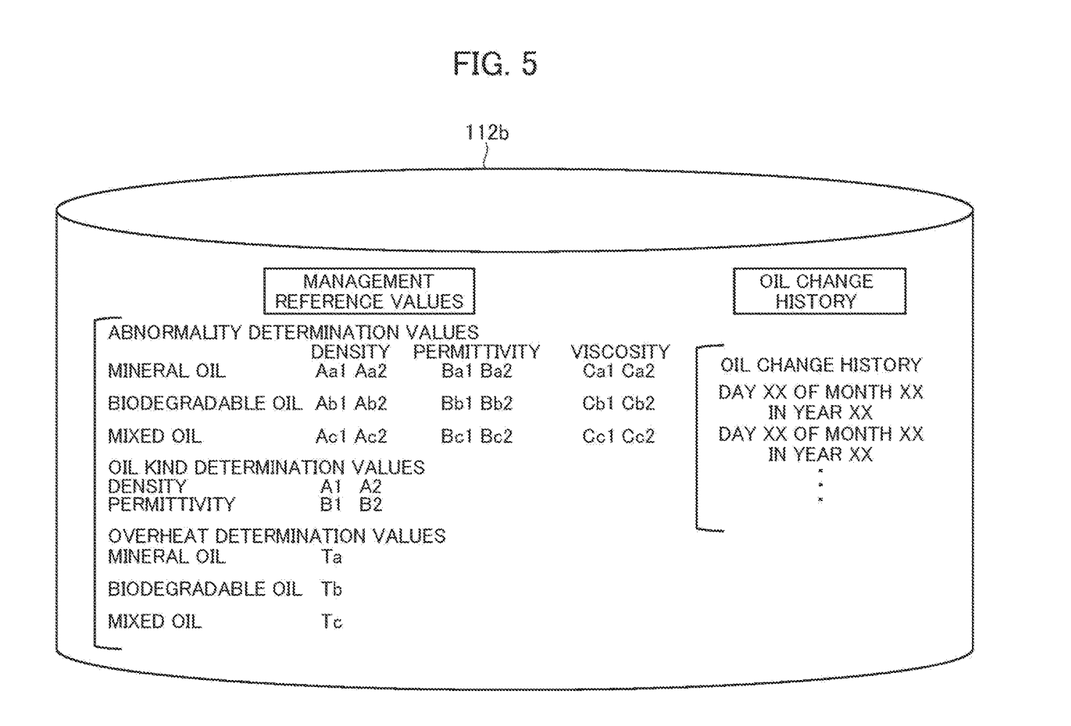
FIG. 5 is a diagram showing management reference values stored in a storage device, the management reference values being used by an abnormality determining section, an oil kind determining section, and an overheat determining section, as well as oil change history information stored in the storage device, the oil change history information being used by the oil kind determining section.

FIG. 5 is a diagram showing management reference values stored in the storage device 112b, the management reference values being used by the abnormality determining section 211, the oil kind determining section 214, and the overheat determining section 215 described above, as well as oil change history information stored in the storage device 112b, the oil change history information being used by the oil kind determining section 214.

The storage device 112b stores the following threshold values as the management reference values.

<Abnormality Determination Values>
  Case where the Hydraulic Fluid is the Mineral Oil
   Density: Aa1, Aa2
   Permittivity: Ba1, Ba2
   Viscosity: Ca1, Ca1
  Case where the Hydraulic Fluid is the Biodegradable Oil
   Density: Ab1, Ab2
   Permittivity: Bb1, Bb2
   Viscosity: Cb1, Cb2
  Case where the Hydraulic Fluid is the Mixed Oil
   Density: Ac1, Ac2
   Permittivity: Bc1, Bc2
   Viscosity: Cc1, Cc2
<Oil Kind Determination Values>
   Density: A1, A2
   Permittivity: B1, B2
<Overheat Determination Values (Temperature Threshold Values)>
   Mineral oil: Ta
   Biodegradable oil: Tb
   Mixed oil: Tc Incidentally, these threshold values as the management reference values are managed and stored for each machine number and model of the hydraulic excavator 300 and each hydraulic fluid brand.

In addition, the storage device 112b stores the following date data as the oil change history information.

Day XX of month XX in year XX, day XX of month XX in year XX, . . . .

This oil change history information is managed and recorded for each machine number of the hydraulic excavator 300.

As shown in FIG. 4, the controller 104a of the manufacturer computer 112 is connected with a monitor 112c and an input device not shown (for example, numeric keys, a keyboard, a touch panel, or the like) which inputs information from the operator. The management reference values (the abnormality determination values, the oil kind determination values, and the overheat determination values) are stored in the storage device 112b by operation of the monitor 112c and the input device by the operator.

The work machine controller 110 is also connected with a monitor 110a (see FIG. 4) and an input device not shown. An oil change history is stored in the storage device 112b through transmission of a switch signal notifying a replacement of the hydraulic fluid within the hydraulic excavator 300 to the manufacturer computer 112 by operation of the monitor 110a and the input device by the operator, and input of the switch signal by the controller 104a.

The oil change information may be obtained from the manager (user) of the hydraulic excavator 300 or the service person in charge (serviceperson) who performs troubleshooting and maintenance of the hydraulic excavator 300, and the operator of the manufacturer computer 112 may store the oil change history in the storage device 112b by operating the monitor 112c and the input device. In addition, when the controller 104a of the manufacturer computer 112 has a function that can determine whether or not an oil change has been made from the sensor information 102, oil change information obtained by the determination may be stored in the storage device 112b.

Figure 6:
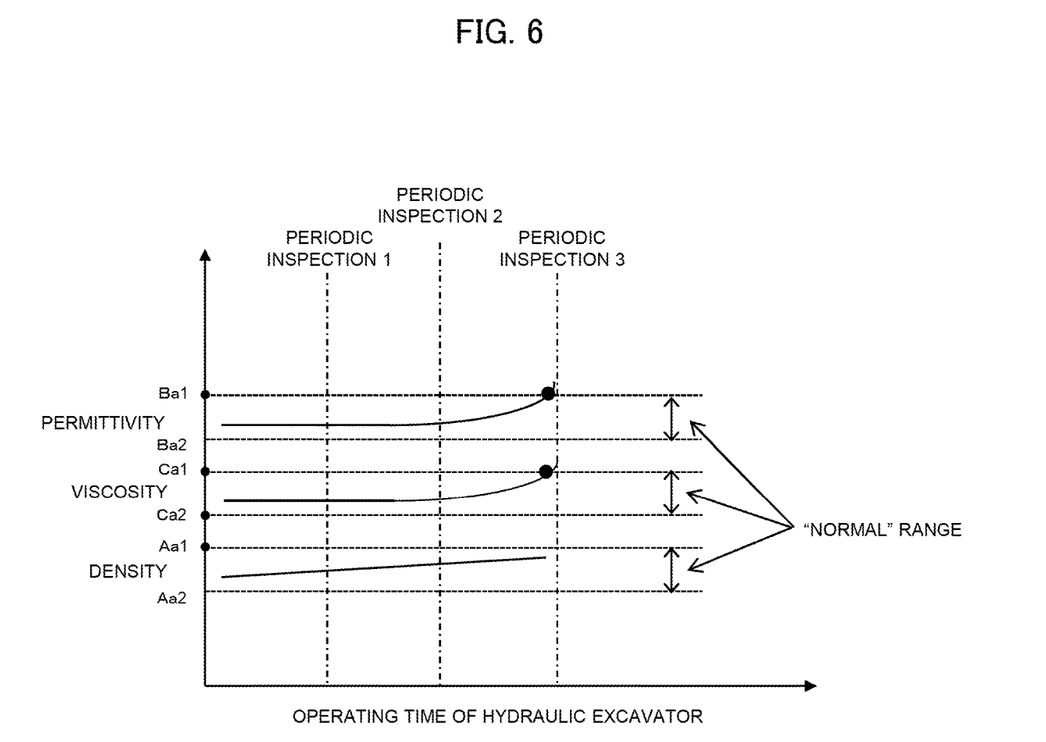
FIG. 6 is a diagram showing a concept of abnormality determination of the abnormality determining section.

FIG. 6 is a diagram showing a concept of abnormality determination of the abnormality determining section 211. The concept of the abnormality determination in FIG. 6 is a concept in a case where the hydraulic fluid is the mineral oil.

In FIG. 6, in the present embodiment, two abnormality determination values, that is, an upper side abnormality determination value Aa1 larger than a normal initial value and a lower side abnormality determination value Aa2 smaller than the initial value are defined for the density of the hydraulic fluid (mineral oil). Similarly, two abnormality determination values, that is, an upper side abnormality determination value Ba1 or Ca1 larger than a normal initial value and a lower side abnormality determination value Ba2 or Ca2 smaller than the initial value are defined also for the permittivity and the viscosity of the hydraulic fluid (mineral oil). For each of the density, the permittivity, and the viscosity, the abnormality determining section 211 determines an abnormality when the density, the permittivity, and the viscosity of the sensor information A, B, and C exceed the upper side abnormality determination values Aa1, Ba1, and Ca1 and when the density, the permittivity, and the viscosity of the sensor information A, B, and C fall below the lower side abnormality determination values Aa2, Ba2, and Ca2.

Incidentally, in view of characteristics of changes with time in the properties of the hydraulic fluid (mineral oil), two abnormality determination values, that is, the upper side abnormality determination value Ca1 and the lower side abnormality determination value Ca2 may be defined for only the viscosity of the hydraulic fluid (mineral oil), and only the upper side abnormality determination values Aa1 and Ba1 may be defined for the density and the permittivity of the hydraulic fluid (mineral oil). In this case, for the viscosity, the abnormality determining section 211 determines an abnormality when the sensor information C exceeds the upper side abnormality determination value Ca1 and when the sensor information C falls below the lower side abnormality determination value Ca2, and for the density and the permittivity, the abnormality determining section 211 determines an abnormality when the sensor information A and B exceeds the abnormality determination values Aa1 and Ba1, respectively.

Also when the hydraulic fluid is the biodegradable oil and when the hydraulic fluid is the mixed oil, the concept of the abnormality determination is the same, with only the abnormality determination values changed to the threshold values of the biodegradable oil and the mixed oil.

Figure 7:
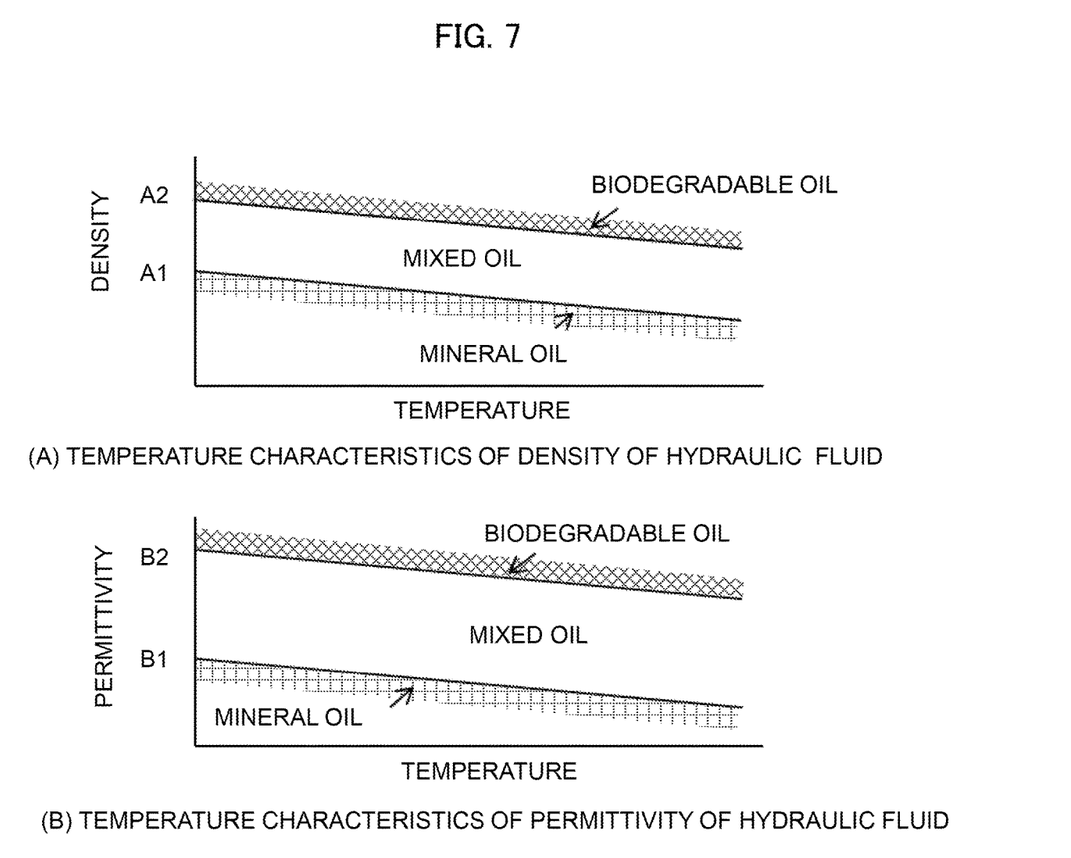
FIG. 7 is a physical property value characteristic diagram in a case where a hydraulic fluid is a mineral oil and in a case where the hydraulic fluid is a biodegradable oil, and is a diagram showing temperature characteristics of the density of the hydraulic fluid (upper side) and temperature characteristics of the permittivity of the hydraulic fluid (lower side).

FIG. 7 is a physical property value characteristic diagram in a case where the hydraulic fluid is the mineral oil and in a case where the hydraulic fluid is the biodegradable oil, and is a diagram showing temperature characteristics of the density of the hydraulic fluid (upper side) and temperature characteristics of the permittivity of the hydraulic fluid (lower side).

Investigation of many kinds of hydraulic fluids used in work machines has confirmed that the mineral oil and the biodegradable oil have significantly different physical property values in terms of the density and the permittivity. For example, at 40° C., the density of the mineral oil is 0.84 to 0.86 and the permittivity of the mineral oil is 2.2 to 2.3, whereas at 40° C., the density of the biodegradable oil is 0.9 to 0.92 and the permittivity of the biodegradable oil is 3.0 to 3.4. The hydraulic fluid can be classified as the mineral oil, the biodegradable oil, the mixed oil of these oils, or otherwise by setting oil kind determination values A1 and A2 and oil kind determination values B1 and B2 for the density x of the sensor information A and the permittivity y of the sensor information B on the basis of this difference, making case divisions as in (1) to (4), and making determination.

Density: $x<A1$ and Permittivity: $y<B1\rightarrow$"mineral oil" (1)

Density: $A2<x$ and Permittivity: $B2<y\rightarrow$"biodegradable oil" (2)

Density: $A1<x<A2$ and Permittivity: $B1<x<B2\rightarrow$"mixed oil of the mineral oil and the biodegradable oil" (3)

A combination other than the above→"cause investigation" (4)

Here, the oil kind determination values A1, A2, B1, and B2 are set as follows, for example.

Oil Kind Determination Value A1

A value obtained by adding a first predetermined value to an upper limit value 0.86 of the density 0.84 to 0.86 of the mineral oil (40° C.)

Oil Kind Determination Value A2

A value obtained by subtracting a second predetermined value from a lower limit value 0.9 of the density 0.9 to 0.92 of the biodegradable oil (40° C.)

Oil Kind Determination Value B1

A value obtained by adding a third predetermined value to an upper limit value 2.3 of the permittivity 2.2 to 2.3 of the mineral oil (40° C.)

Oil Kind Determination Value B2

A value obtained by subtracting a fourth predetermined value from a lower limit value 3.0 of the permittivity 3.0 to 3.4 of the biodegradable oil (40° C.)

In the present invention, when one of the mineral oil and the biodegradable oil includes 5 weight % or more of another oil, the oil is defined as the mixed oil. On the basis of this definition, it suffices to set the above-described first to fourth predetermined values as follows.

First Predetermined Value: a value corresponding to an amount of change in the density when the mineral oil includes 5 weight % of the biodegradable oil Second Predetermined Value: a value corresponding to an amount of change in the density when the biodegradable oil includes 5 weight % of the mineral oil Third Predetermined Value: a value corresponding to an amount of change in the permittivity when the mineral oil includes 5 weight % of the biodegradable oil Fourth Predetermined Value: a value corresponding to an amount of change in the permittivity when the biodegradable oil includes 5 weight % of the mineral oil The thus set oil kind determination values A1, A2, B1, and B2 are stored in the storage device 112b.

On the other hand, as for the density and the permittivity of the sensor information A and B to be compared with the oil kind determination values, the density and the permittivity of the sensor information A and B are corrected to values not affected by the temperature of the hydraulic fluid in order to exclude an effect of the temperature of the hydraulic fluid, and the kind of the hydraulic fluid is determined by using the corrected density and the corrected permittivity of the hydraulic fluid. Specifically, since the oil kind determination values A1, A2, B1, and B2 are set with the density and the permittivity of the hydraulic fluid at a temperature of 40° C. as a reference, the density and the permittivity of the sensor information A and B are also corrected to a density and a permittivity at 40° C. on the basis of the temperature of the sensor information D and preset temperature characteristics of the density and the permittivity.

Incidentally, while the oil kind determination values are set on the basis of the density and the permittivity of the hydraulic fluid at a temperature of 40° C. in the present example, the oil kind determination values may be set on the basis of the density and the permittivity at an appropriate temperature other than 40° C. In addition, the density and the permittivity of the oil kind determination values may be converted into values not dependent on the temperature, and the density and the permittivity of the sensor information A and B may also be similarly converted into values not dependent on the temperature.

In addition, with regard to the determination, the mineral oil or the biodegradable oil can be identified by referring to one physical property value of the density or the permittivity, but this results in poor accuracy. For example, when water is mixed in the mineral oil at a time of an oil change, the density does not change very much, but the permittivity becomes extremely high. Consequently, a determination of the mineral oil is made on the basis of the density, and a determination of the biodegradable oil is made on the basis of the permittivity. Thus, accurate determination may not be able to be made by the determination based on only the permittivity. It is therefore possible to isolate an abnormal case as described above by using both of values of the density and the permittivity.

Figure 8:
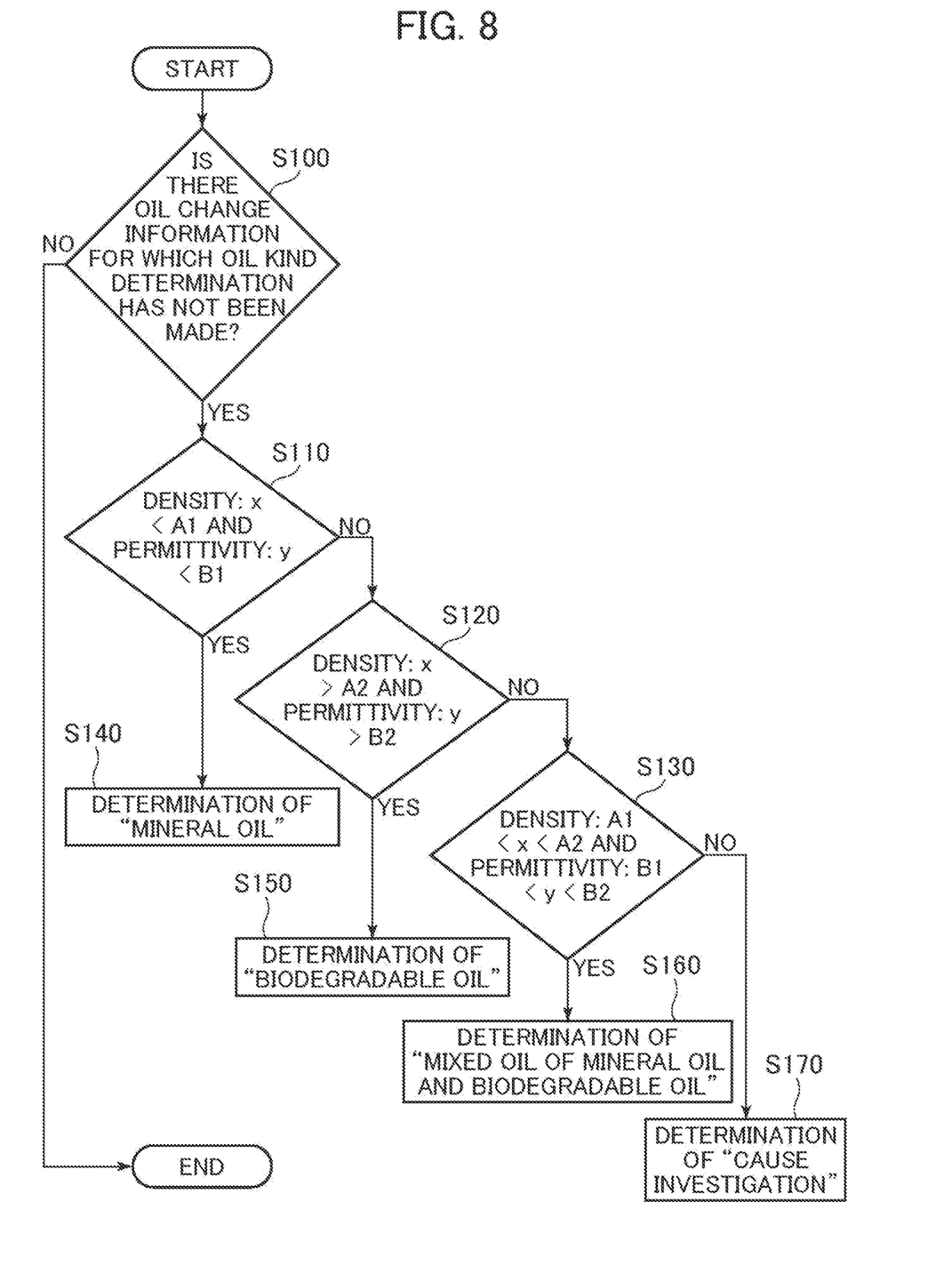
FIG. 8 is a flowchart showing a processing procedure of the oil kind determining section.

FIG. 8 is a flowchart showing a processing procedure of the oil kind determining section 214.

First, the oil kind determining section 214 checks whether the oil change history information stored in the storage device 112b includes oil change information for which oil kind determination has not been made (step S100). When there is oil change information for which oil kind determination has not been made, the oil kind determination values A1, A2, B1, and B2 stored in the storage device 112b are read, case divisions are made as in (1) to (4) described above, and the determination is made (steps S110 to S170).

Figure 9:
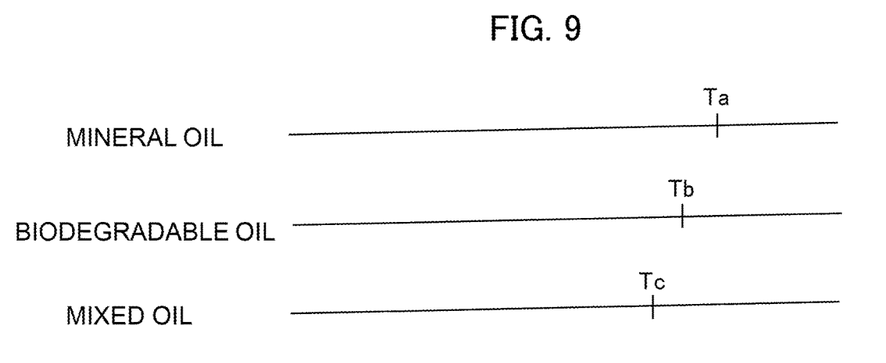
FIG. 9 is a diagram showing magnitude relation between overheat determination values (temperature threshold values) for respective kinds of the hydraulic fluid, the overheat determination values being stored in the storage device.

FIG. 9 is a diagram showing magnitude relation between overheat determination values (temperature threshold values) for the respective kinds of the hydraulic fluid, the overheat determination values being stored in the storage device 112b.

Investigation of many kinds of hydraulic fluids used in work machines has confirmed that an upper limit of the temperature for maintaining performance of the hydraulic fluid is decreased in order of the mineral oil, the biodegradable oil, and the mixed oil. Therefore, the overheat determination values (temperature threshold values) stored in the storage device 112b are set so as to be decreased in order of the mineral oil, the biodegradable oil, and the mixed oil, that is, such that Ta>Tb>Tc.

The overheat determining section 215 selects, according to a result of the determination of a kind of hydraulic fluid in the oil kind determining section 214, a temperature threshold value corresponding to the kind of the hydraulic fluid from among the thus set temperature threshold values Ta, Tb, and Tc. The overheat determining section 215 determines that the hydraulic fluid is in an overheat state when the temperature of the sensor information D exceeds the temperature threshold value.

Figure 10:
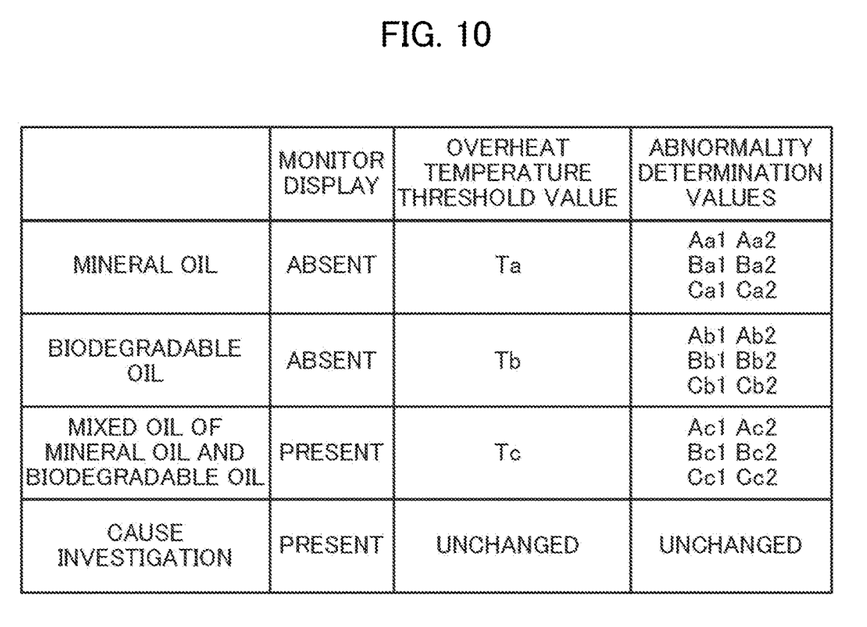
FIG. 10 is a diagram showing a list of processing performed according to a result of determination of the kind of the hydraulic fluid in the oil kind determining section and the processing of a threshold value changing section.

FIG. 10 is a diagram showing a list of processing performed according to the result of the determination of the kind of the hydraulic fluid in the oil kind determining section 214 and the processing of the threshold value changing section 216.

When the determination result of the oil kind determining section 214 is the "mixed oil of the mineral oil and the biodegradable oil" and "cause investigation," the oil kind determining section 214 displays a warning on the monitor 112c in order to make the customer or the serviceperson take action. In addition, preferably, processing of transmitting these pieces of warning information to another terminal (for example, at least one of the work machine controller 110, the manager computer 114, and the service computer 116) is performed, and the warning is displayed also on the monitor of the respective terminal.

Thus, when the hydraulic fluid is the mixed oil, or when it is not clear whether the hydraulic fluid is either the mineral oil or the biodegradable oil or the mixed oil, an appropriate measure can be taken by prompting the customer or the serviceperson to take action.

The threshold value changing section 216 changes, when the determination result of the oil kind determining section 214 is the "mineral oil," the "biodegradable oil," and the "mixed oil of the mineral oil and the biodegradable oil," the abnormality determination values and the temperature threshold values used by the abnormality determining section 211 and the overheat determining section 215 according to the determination result.

Consequently, damage to hydraulic parts of the work machine due to a decrease in performance of the hydraulic fluid can be prevented even when the hydraulic fluid of the hydraulic system is replaced and the hydraulic fluid becomes the biodegradable oil, or even when the hydraulic fluid becomes the mixed oil in which the mineral oil and the biodegradable oil are mixed with each other. In addition, the overheat of the hydraulic fluid can be managed appropriately according to the kind and state of the hydraulic fluid.

Incidentally, the calculating device 210b of the controller 104a may further include a pump output power limiting section 217 as indicated by a chain double-dashed line in FIG. 4, and when the oil kind determining section 214 determines that the hydraulic fluid is the mixed oil of the mineral oil and the biodegradable oil, the calculating device 210b may output an electric signal to reduce the set value of the above-described maximum torque of the regulator 504a of the hydraulic pump 504, and thereby perform control so as to reduce the maximum absorption torque (output power) of the hydraulic pump 504. This control can be performed by, for example, providing the regulator 504a of the hydraulic pump 504 with a pressure receiving portion to which the output pressure of a solenoid valve is introduced on a side opposed to the spring setting the maximum torque of the hydraulic pump 504, outputting the electric signal from the pump output power limiting section 217 to the solenoid valve, and thus actuating the solenoid valve. Consequently, when the hydraulic fluid is the mixed oil, it is possible to make the operator recognize that the hydraulic fluid is the mixed oil, and prompt the operator to make an appropriate replacement of the hydraulic fluid, by reducing the maximum torque of the hydraulic pump 504 and thus decreasing the operation output power of the hydraulic excavator 300.

As described above, according to the present embodiment, when the oil change history information includes oil change information for which oil kind determination has not been made, the kind of the hydraulic fluid is determined on the basis of the value of at least one of the plurality of oil properties detected by the oil sensor 120 and the oil kind determination values, and an abnormality in the hydraulic fluid is determined by using an abnormality determination value corresponding to a result of the determination of the kind of the hydraulic fluid. Thus, damage to hydraulic parts of the work machine due to a decrease in performance of the hydraulic fluid can be prevented even when the hydraulic fluid of the hydraulic system is replaced and the hydraulic fluid becomes the mixed oil in which the mineral oil and the biodegradable oil are mixed with each other.

In addition, since the kind of the hydraulic fluid is determined by using the density and the permittivity of the hydraulic fluid detected by the oil sensor 120, and the respective oil kind determination values stored in the storage device 112b, the oil kind can be determined accurately.

In addition, the kind of the hydraulic fluid is determined by using a temperature-corrected density and a temperature-corrected permittivity of the hydraulic fluid. Thus, this also makes it possible to determine the oil kind accurately.

In addition, when there is oil change information for which oil kind determination has not been made, whether the hydraulic fluid is either the mineral oil or the biodegradable oil or the mixed oil can be determined by reading the oil kind determination values A1, A2, B1, and B2 stored in the storage device 112b, making case divisions as in (1) to (4) described above, and making the determination. In addition, when the hydraulic fluid is the mixed oil, or when it is not clear whether the hydraulic fluid is either the mineral oil or the biodegradable oil or the mixed oil, an appropriate measure can be taken by prompting the customer or the serviceperson to take action.

Further, the temperature threshold value corresponding to the result of the determination of the kind of the hydraulic fluid among the temperature threshold values for the respective kinds of the hydraulic fluid is compared with the temperature of the hydraulic fluid detected by the oil sensor 120, and whether the hydraulic fluid is in an overheat state is determined. Thus, damage to hydraulic parts of the work machine due to a decrease in performance of the hydraulic fluid can be prevented even when the hydraulic fluid becomes the biodegradable oil, or when the hydraulic fluid becomes the mixed oil in which the mineral oil and the biodegradable oil are mixed with each other. In addition, overheat of the hydraulic fluid can be managed appropriately according to the kind and state of the hydraulic fluid.

In addition, when the hydraulic fluid is judged to be the mixed oil of the mineral oil and the biodegradable oil, the operation output power of the hydraulic excavator 300 is decreased by performing control so as to reduce the output power of the hydraulic pump 504. The operator can therefore be made to recognize that the hydraulic fluid is the mixed oil, and can be prompted to make an appropriate replacement of the hydraulic fluid.

DESCRIPTION OF REFERENCE CHARACTERS

102: Sensor information
103: Storage device
110: Work machine controller
110a: Monitor
112: Manufacturer Computer (server)
112a: Controller (control system)
112b: Storage device
112c: Monitor
114: Manager Computer
116: Service Computer
120: Oil sensor
211: Abnormality determining section
212: Cause identifying section
213: Handling manual transmitting section
214: Oil kind determining section
215: Overheat determining section
216: Threshold value changing section
300: Hydraulic excavator
301: Lower track structure
302: Upper swing structure
303: Front work implement
310, 311, 317, 321, 322, 323: Plurality of actuators
500: Hydraulic system
Aa1, Aa2, Ba1, Ba2, Ca1, Ca1: Abnormality determination value (the density, permittivity, and viscosity of a mineral oil)
Ab1, Ab2, Bb1, Bb2, Cb1, Cb2: Abnormality determination value (the density, permittivity, and viscosity of a biodegradable oil)
Ac1, Ac2, Bc1, Bc2, Cc1, Cc2: Abnormality determination value (the density, permittivity, and viscosity of a mixed oil)
A1, A2: Oil kind determination value (density)
B1, B2: Oil kind determination value (permittivity)
Ta, Tb, Tc: Temperature threshold value (the mineral oil, the biodegradable oil, and the mixed oil)

The invention claimed is:

1. A work machine management system comprising:
a work machine including a hydraulic system that drives a plurality of actuators by a hydraulic fluid and an oil sensor that detects a plurality of oil properties including a density and a permittivity of the hydraulic fluid;
a storage device that stores respective abnormality determination values of the plurality of oil properties; and
a controller that diagnoses an abnormality in the hydraulic fluid by comparing respective values of the plurality of oil properties detected by the oil sensor with the respective abnormality determination values of the plurality of oil properties, the abnormality determination values being stored in the storage device, wherein
the storage device stores,
in advance, oil change history information of the hydraulic fluid, oil kind determination values for determining whether the hydraulic fluid is either a mineral oil or a biodegradable oil or a mixed oil of the mineral oil and the biodegradable oil, the oil kind determination values being set by at least one of a density and a permittivity of the hydraulic fluid, and abnormality determination values for respective kinds of the hydraulic fluid as the abnormality determination values, and the controller is configured to check whether the oil change history information stored in the storage device includes oil change information for which oil kind determination has not been made, determine a kind of the hydraulic fluid on a basis of the value of at least one of the plurality of oil properties detected by the oil sensor and the oil kind determination values stored in the storage device when there is oil change information for which oil kind determination has not been made, and determine the abnormality in the hydraulic fluid by using abnormality determination values of the hydraulic fluid corresponding to a result of determination of the kind of the hydraulic fluid, among the abnormality determination values for the respective kinds of the hydraulic fluid.

2. The work machine management system according to claim 1, wherein the storage device stores oil kind determination values set by each of the permittivity and the density of the hydraulic fluid as the oil kind determination values, and the controller is configured to determine the kind of the hydraulic fluid by using the density and the permittivity of the hydraulic fluid detected by the oil sensor and the respective oil kind determination values stored in the storage device.

3. The work machine management system according to claim 2, wherein the oil sensor further detects a temperature of the hydraulic fluid, and the controller is configured to correct the density and the permittivity of the hydraulic fluid detected by the oil sensor, to values not affected by the temperature of the hydraulic fluid, and determine the kind of the hydraulic fluid by using the corrected density and the corrected permittivity of the hydraulic fluid.

4. The work machine management system according to claim 2, wherein the storage device stores a first threshold value and a second threshold value larger than the first threshold value as the oil kind determination values for each of the density and the permittivity of the hydraulic fluid, and the controller is configured to determine that the hydraulic fluid is the mineral oil when the density and the permittivity of the hydraulic fluid detected by the oil sensor are both equal to or less than the first threshold value, determine that the hydraulic fluid is the biodegradable oil when the density and the permittivity of the hydraulic fluid are both equal to or more than the second threshold value, and determine that the hydraulic fluid is the mixed oil of the mineral oil and the biodegradable oil when the density and the permittivity of the hydraulic fluid are both a value between the first threshold value and the second threshold value.

5. The work machine management system according to claim 4, wherein the controller is configured to determine that a cause investigation is necessary and output a cause investigation request when both the density and the permittivity of the hydraulic fluid are a combination other than in divisions of the first threshold value and the second threshold value.

6. The work machine management system according to claim 1, wherein the oil sensor further detects a temperature of the hydraulic fluid, the storage device stores temperature threshold values for the respective kinds of the hydraulic fluid used for determining overheat of the hydraulic fluid, and the controller is configured to compare a temperature threshold value of the hydraulic fluid corresponding to the result of the determination of the kind of the hydraulic fluid among the temperature threshold values for the respective kinds of the hydraulic fluid with the temperature of the hydraulic fluid detected by the oil sensor, and determine whether the hydraulic fluid is in an overheat state.

7. The work machine management system according to claim 6, wherein the temperature threshold values for the respective kinds of the hydraulic fluid are decreased in order of the mineral oil, the biodegradable oil, and the mixed oil.

8. The work machine management system according to claim 1, wherein the hydraulic system includes a variable displacement hydraulic pump that supplies the hydraulic fluid to the plurality of actuators, and the controller is configured to perform control so as to reduce an output power of the hydraulic pump by outputting an electric signal to reduce a set value of a maximum torque of the hydraulic pump when the controller determines that the hydraulic fluid is the mixed oil of the mineral oil and the biodegradable oil.

* * * * *